(12) United States Patent
Kawabata et al.

(10) Patent No.: US 7,712,374 B2
(45) Date of Patent: May 11, 2010

(54) LOAD DETECTING APPARATUS

(75) Inventors: Hideki Kawabata, Chita-gun (JP);
Muneto Inayoshi, Nagoya (JP); Kan Ichihara, Kariya (JP); Yoshimasa Asano, Anjo (JP); Hiroyuki Fujii, Kariya (JP); Naoka Kawajiri, Kariya (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/203,452

(22) Filed: Sep. 3, 2008

(65) Prior Publication Data
US 2009/0064792 A1   Mar. 12, 2009

(30) Foreign Application Priority Data
Sep. 7, 2007   (JP) .............................. 2007-232922

(51) Int. Cl.
  *G01L 1/00* (2006.01)
(52) U.S. Cl. ....................................................... 73/781
(58) Field of Classification Search .................... 73/781
  See application file for complete search history.

(56) References Cited

U.S. PATENT DOCUMENTS

| 7,155,981 | B2 | 1/2007 | Matsuura et al. |
| 7,514,638 | B2 * | 4/2009 | Inayoshi et al. ............. 177/136 |
| 2008/0098822 | A1 | 5/2008 | Sakamoto et al. |
| 2008/0098823 | A1 | 5/2008 | Sumi et al. |
| 2008/0127752 | A1 | 6/2008 | Nakano et al. |
| 2008/0156103 | A1 | 7/2008 | Nakano et al. |

FOREIGN PATENT DOCUMENTS

| JP | 2003-83707 | 3/2003 |
| WO | WO 2005/080931 A1 | 9/2005 |

* cited by examiner

*Primary Examiner*—Lisa M Caputo
*Assistant Examiner*—Octavia Davis
(74) *Attorney, Agent, or Firm*—Oblon, Spivak, McClelland, Maier & Neustadt, L.L.P.

(57) ABSTRACT

A load detecting apparatus includes a strain member, a supporting member, a load input member and a strain detecting element. The supporting member is employed for supporting the strain member at a supporting portion thereof. The load input member is supported by the strain member and strains the strain member when an external load is applied thereon. The strain detecting element is provided at at least a surface of the strain member for detecting the strain generated by the load input member. Further, an outer end of the supporting portion located outwardly relative to the load input member is fixed to the strain member.

10 Claims, 6 Drawing Sheets

LOAD DETECTING APPARATUS

CROSS REFERENCE TO RELATED APPLICATIONS

This application is based on and claims priority under 35 U.S.C. §119 to Japanese Patent Application 2007-232922, filed on Sep. 7, 2007, the entire content of which is incorporated herein by reference.

FIELD OF THE INVENTION

The present invention generally relates to a load detecting apparatus.

BACKGROUND

A known load detecting apparatus for detecting external load (externally applied load) by a strain (displacement) is disclosed in JP2003-83707A (hereinafter referred to as reference 1). According to the reference 1, a detecting member is press-fitted into a detection hole formed at a sensor substrate (strain member) and the external force is acted on an end portion of the detecting member, at which the detecting member comes in contact with the sensor substrate. Further, first and second fixing members (supporting members) are press-fitted into first and second fixing holes formed at the sensor substrate, respectively. Then, counter force is generated at end portions of the first and second fixing members, at which the first and second fixing members come in contact with the sensor substrate. The load detecting apparatus detects strain generated due to the external force and the counter force by means of strain detecting elements.

Further, according to a load detecting apparatus disclosed in WO2005/080931A1 (hereinafter referred to as reference 2), a fixing member (supporting member) is structured with an upper washer and a lower washer. The upper washer is press-fitted into the lower washer, thus supporting (interposing) a sensor substrate. Accordingly, the fixing member is fixed to the sensor substrate. Further, strain detecting elements are provided on the sensor substrate. The load detecting apparatus structured as above is secured to an object to be measured via the supporting member.

According to the structure of the load detecting apparatus disclosed in the references 1 and 2, because the fixing member(s) is press-fitted into the sensor substrate and is secured thereat, strain may be generated at positions adjacent to the fixing member(s) on the sensor substrate (a portion of the substrate adjacent to the fixing member) due to the force for press-fitting the fixing member(s) into the sensor substrate. Therefore, in a condition where the strain detecting elements are to be positioned in the vicinity of the fixing members, a value outputted from the strain detecting elements may be deviated from a zero point (a point of origin), and detecting accuracy (sensitivity) may be negatively affected because of influence of the generated strain, thus leading to a reduction of precision for detecting the external load.

A need thus exists for a load detecting apparatus which is not susceptible to the drawback mentioned above.

SUMMARY OF THE INVENTION

According to an aspect of the present invention, a load detecting apparatus includes a strain member, a supporting member, a load input member and a strain detecting element. The supporting member is employed for supporting the strain member at a supporting portion thereof. The load input member is supported by the strain member and strains the strain member when an external load is applied thereon. The strain detecting element is provided at at least a surface of the strain member for detecting the strain generated by the load input member. Further, an outer end of the supporting portion located outwardly relative to the load input member is fixed to the strain member.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
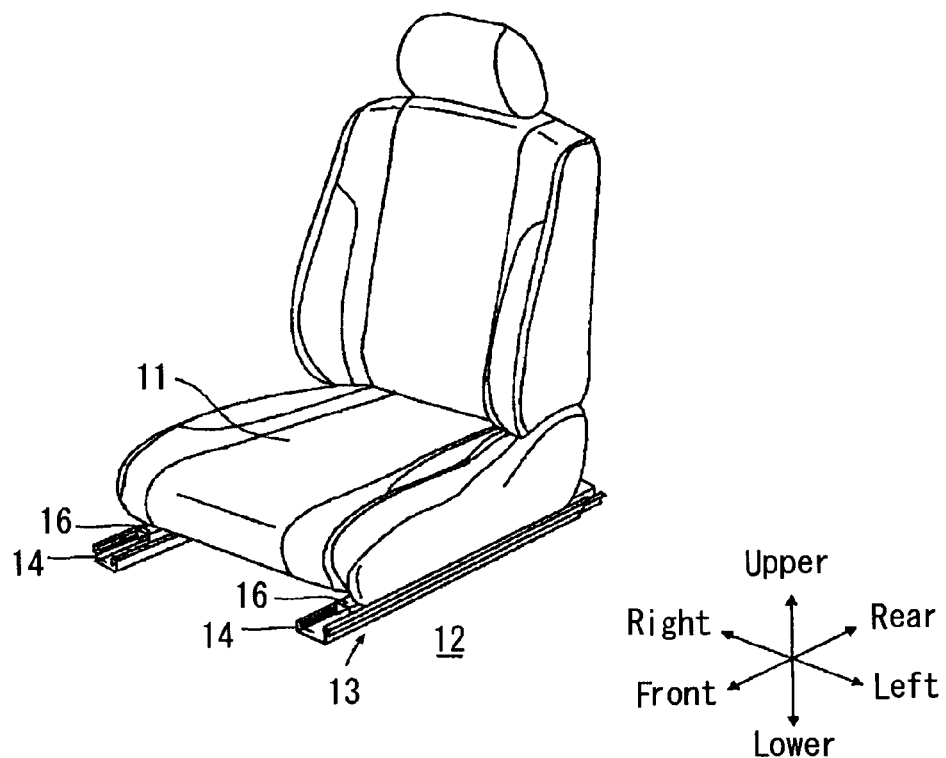
FIG. 1 is a perspective view illustrating a seat for a vehicle.
Figure 2:
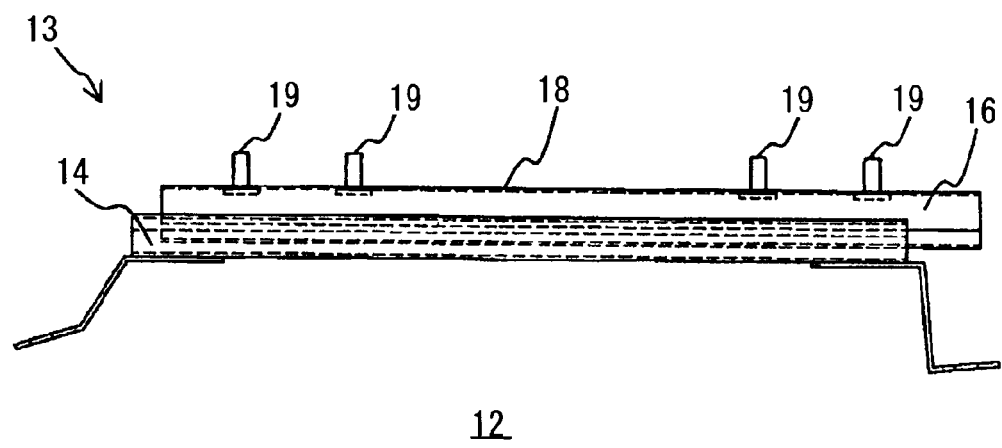
FIG. 2 is a side view illustrating a seat slide apparatus by which the seat for the vehicle is secured at a floor of the vehicle.
Figure 3:
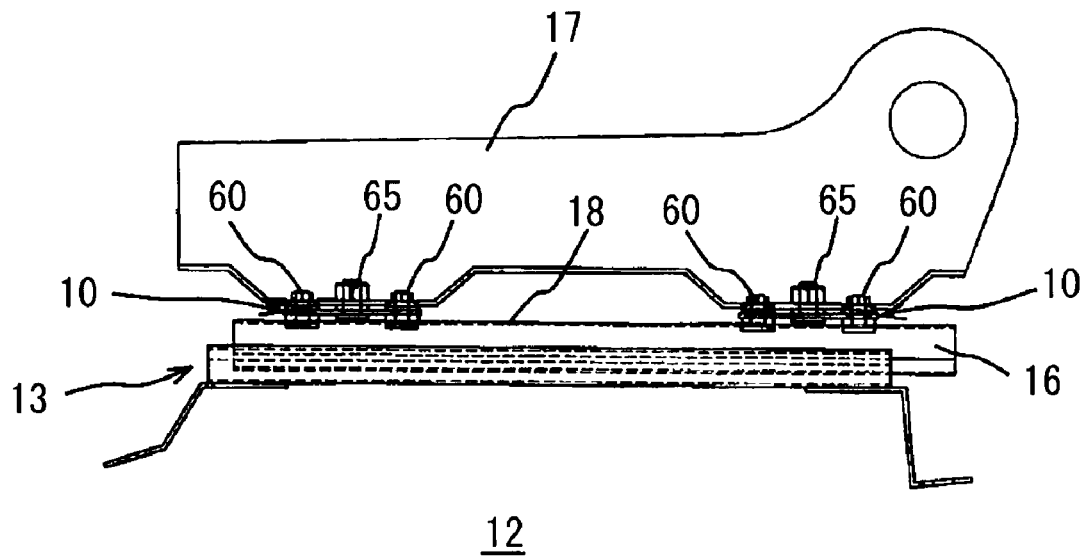
FIG. 3 is a side view illustrating a seat frame secured at the seat slide apparatus via a load detecting apparatus.
Figure 4:
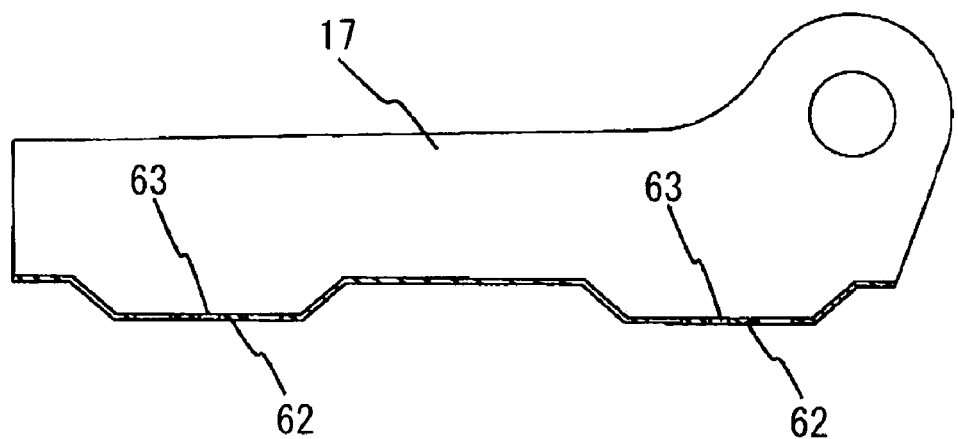
FIG. 4 is a longitudinal cross sectional view illustrating the seat frame.

An embodiment of a load detecting apparatus 10 will be described hereinafter. The load detecting apparatus 10 is adapted to be attached to a seat body 11 of a seat for a vehicle, which is illustrated in FIG. 1, so as to measure a load of an occupant seated thereon. Arrows illustrated in FIG. 1 for indicating direction such as upper, lower, right, left, front and rear correspond to an orientation of the occupant seated on the seat body 11. With reference to FIG. 2, a seat slide apparatus 13 is employed for securing the seat body 11 to a vehicle floor 12 so as to adjust a position of the seat body 11 relative to the vehicle floor 12. The seat slide apparatus 13 is structured with first and second lower rails 14 each of which is secured at the vehicle floor 12 and extends in the front-rear direction of the vehicle (i.e., a left-right direction in FIG. 2), first and second upper rails 16 which are respectively movably supported relative to the first and second lower rails 14 to be locked at an adjusted position by a lock mechanism (not illustrated), and the like. Each of the first and second upper rails 16 serves as a rail member. Further, a pair of fixing shafts 19 for fixing the load detecting apparatus 10 is provided at each of front and rear end portions of each of the first and second upper rails 16 so as to extend vertically upwardly. The pair of fixing shafts 19 provided at the front end portion of each upper rail 16 and the pair of fixing shafts 19 provided at the rear end portion of the upper rail 16 are spaced away from each other by a predetermined distance. As illustrated in FIG. 3, a seat frame 17 is secured at an attachment surface 18 formed at an upper surface of each upper rail 16 via the load detecting apparatus 10 provided at a lower surface of the seat frame 17. The seat frame 17 serves as a seat fixing member for supporting a seat cushion of the seat body 11. The seat frame 17 is secured at the first and second upper rails 16 at four corners of the seat frame 17, which are front-left, front-right, rear-left and rear-right corners thereof. As illustrated in FIG. 4, a connecting surface 62 is formed at the seat frame 17. Further, connecting holes 63 are defined (pierced) at the connecting surface 62 of the seat frame 17.

Figure 5:
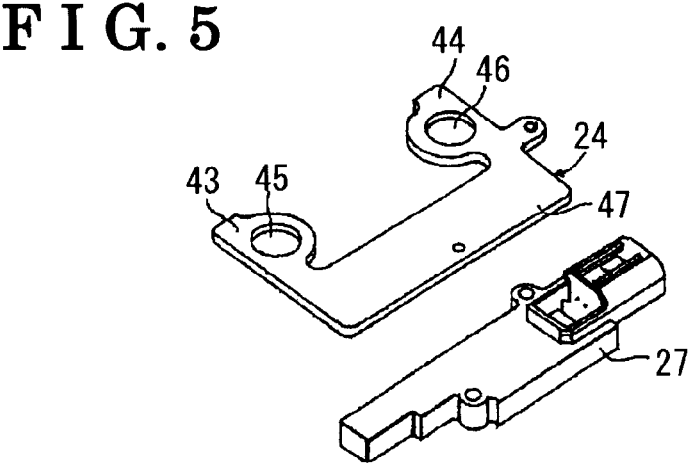
FIG. 5 is an exploded view of the load detecting apparatus.
Figure 5:
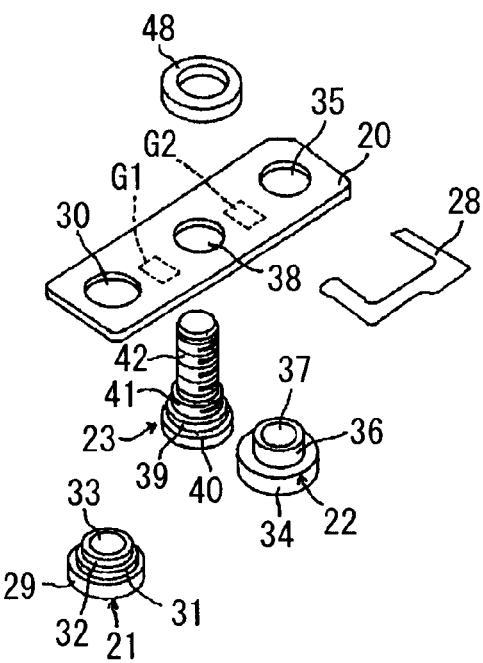
Figure 7:
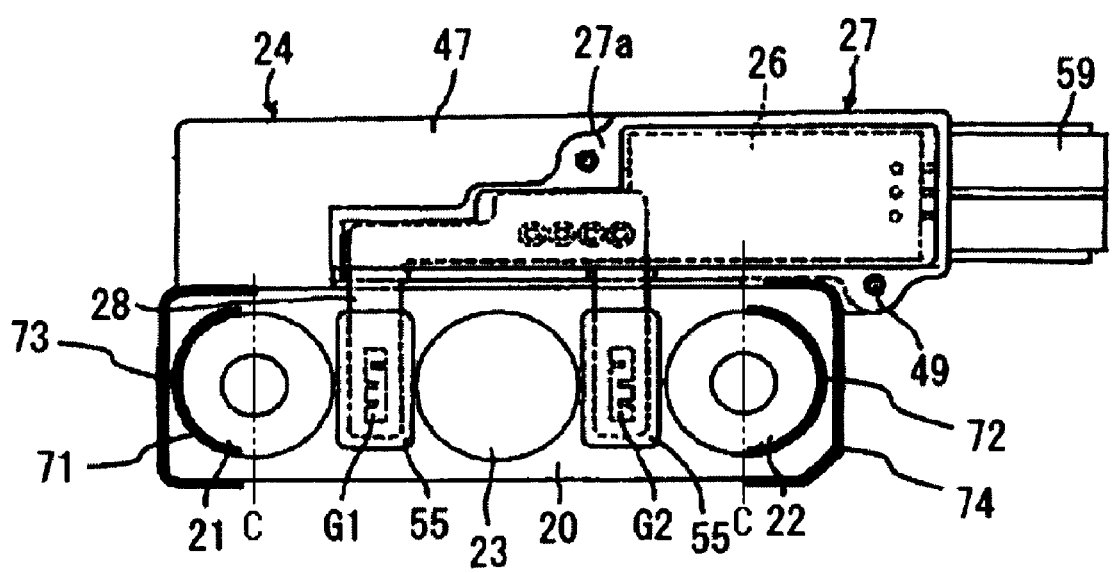
FIG. 7 is an explanatory view illustrating outer portions (welding area) for securing supporting portions of the load detecting apparatus.

As illustrated in FIGS. 5 and 7, each load detecting apparatus 10 includes a strain member 20, strain detecting elements (hereinafter referred to as strain gauges) G1 and G2, first and second supporting members (hereinafter, referred to as first and second lower bracket) 21, 22, a load input member 23, an upper bracket 24, an amplifier apparatus 27 and an FPC (Flexible Printed Circuits) substrate 28. The strain member 20 is formed in an elongated shape. The strain gauges G1 and G2 are attached at a lower surface of the strain member 20. The strain member 20 is secured at the attachment surface 18 of the upper rail 16 at both longitudinal ends (first and second end portions) of the strain member 20 by means of the first and second lower brackets 21 and 22. The load input member 23 is securely supported at an intermediate portion of the strain member 20 so as to be spaced away from each of the first and second lower brackets 21 and 22 in a longitudinal direction of the strain member 20 and so as to vertically protrude therefrom. Further, the load input member 23 is secured at the seat frame 17 of the seat body 11. The upper bracket 24 is secured at an upper surface of the strain member 20 at both longitudinal ends thereof. The amplifier apparatus 27 is attached at a lower surface of an attachment portion of the upper bracket 24 so as to be arranged in parallel with the strain member 20. Further, the amplifier apparatus 27 accommodates therein an amplifier substrate 26 for amplifying signals outputted from the strain gauges G1 and G2. The FPC substrate 28 is connected to the strain gauges G1, G2 and the amplifier substrate 26. With reference to FIG. 7, coating portions 55 protect connecting portions between the FPC substrate 28 and the strain gauges G1, G2, respectively.

Back to FIG. 5, the first lower bracket 21 includes a first supporting portion 29, a first intermediate shaft portion 31, an upper shaft portion 32 and a first attachment hole 33. The first supporting portion 29 includes a predetermined thickness in the vertical direction. The first intermediate shaft portion 31 protrudes upwardly from the first supporting portion 29 and is to be inserted into a first hole 30 defined (formed) at the first end potion of the straining member 20. The upper shaft portion 32 protrudes from the first intermediate shaft portion 31. The first attachment hole 33 is defined (formed) at a center of the first lower bracket 21 so as to penetrate therethrough. The second lower bracket 22 includes a second supporting portion 34, a second intermediate shaft portion 36 and a second attachment hole 37. The second supporting potion 34 includes a predetermined thickness in the vertical direction. The second intermediate shaft portion 36 protrudes upwardly from the second supporting portion 34 and is to be inserted into a second hole 35 defined (formed) at the second end portion of the straining member 20. The second attachment hole 37 is defined (formed) at a center of the second lower bracket 22 so as to penetrate therethrough.

The first and second holes 30 and 35 are defined at the first and second end portions of each stain member 20. The first and second holes 30 and 35 are spaced away from each other by a predetermined distance which is substantially the same as the distance between the pair of fixing shafts 19 provided at each end portion of each upper rail 16. When the first and second lower brackets 21 and 22 are fitted into the strain member 20, the first intermediate shaft 31 of the first lower bracket 21 and the second intermediate shaft 36 of the second lower bracket 22 are fitted into the first and second holes 30 and 35 of the strain member 20, respectively. Further, the first supporting portion 29 of the first lower bracket 21 and the second supporting portion 34 of the second lower bracket 22 come in contact with the lower surface of the strain member 20. Herein, as illustrated in FIG. 7, outer semi-circular portions of the first and second supporting portion 29 and 34, which are located at outer sides thereof relative to the load input member 23, are assigned to be outer end portions 71 and 72, respectively. In other words, each of the outer end portions 71 and 72 is an end portion located outwardly relative to the load input member 23 further than a (imaginary) center line C, which extends horizontal direction of the strain member perpendicular to the longitudinal direction of the strain member 20, of each of the lower brackets 21 and 22. The outer end portions 71, 72 of the first and second lower brackets 21, 22 are fixed at the strain member 20 by welding. Thus, by welding the outer end portions 71 and 72 (outer semi-circular portions) of the first and second lower brackets 21 and 22, a strain (counter force), which may be generated due to the welding, is restrained from being generated at positions where the strain gauges G1 and G2 (which will be described later) are respectively attached on the strain member 20. Therefore, the strain generated due to the external force (load of the occupant of the seat) is accurately detected by the strain detecting elements. Herein, general welding manner such as arc welding, spot welding, laser welding, ultrasonic welding, and the like may be employed. According to the embodiment, the first intermediate shaft portion 31 and the upper shaft portion 32 are provided at the first supporting portion 29 of the first lower bracket 21. Alternatively, only the first supporting portion 29 may be formed at the first lower bracket 21, or only the first supporting portion 29 and the first intermediate shaft portion 31 may be formed at the first lower bracket 21. Further, the second intermediate shaft portion 36 is provided at the second supporting portion 34 of the second lower bracket 22. Alternatively, only the second supporting portion 34 may be provided at the second lower bracket 22. According to the embodiment, the first and second brackets are formed in a circular shape. However, other forms, such as a quadrate shape, may be employed for the first and second lower brackets 21 and 22.

A central hole 38 is defined (formed) at a central portion of the strain member 20. An intermediate shaft portion 39 of the load input member 23 is fitted into the central hole 38. A flange 40 is formed at an end portion (lower end portion in FIG. 5) of the load input member 23. Thickness of the flange 40 is smaller than thickness of the first and second supporting portions 29, 34 of the first and second lower brackets 21, 22. The flange 40 of the load input member 23 comes in contact with the lower surface of the strain member 20 when the load input member 23 is fitted into the central hole 38. An end shaft portion 41 is provided to protrude from an end surface (upper surface in FIG. 5) of the intermediate shaft portion 39. Further, a fixing thread portion 42 is provided to protrude from an end surface (upper surface) of the end shaft portion 41. An outer circumferential surface of the end shaft portion 41 is threaded. An inner surface of a center bracket 48 is screwed onto the end shaft portion 41 in a state where the intermediate shaft portion 39 of the load input member 23 is fitted into the central hole 38 of the strain member 20. Accordingly, the strain member 20 is supported (interposed) between the flange 40 and the center bracket 48, thus fixing the load input member 23 to the strain member 20.

The pair of fixing shafts 19, which vertically protrudes from each end portion of each upper rail 16, are fitted into the first attachment hole 33 of the first lower bracket 21 and the second attachment hole 37 of the second lower bracket 22, and bottom surfaces of the first and second supporting portions 29, 34 of the first and second lower brackets 21, 22 are fixed at the attachment surface 18 of the upper rail 16 as illustrated in FIG. 3. A thread portion is formed at an end portion of each of the fixing shafts 19. Then, nuts 60 are tightened to (screwed onto) the thread portions of the fixing shafts 19 and press first and second supporting portions 43, 44 of the upper bracket 24, which will be described later. Thus, the first and second end portions of the strain member 20 of the load detecting apparatus 10 are fixed to the attachment surface 18 of the upper rail 16 while including a predetermined distance from the attachment surface 18, which corresponds to the thickness of the first and second supporting portions 29, 30 of the first and second lower brackets 21, 22.

Further, the end portion of the load input member 23 is connected to the seat body 11, as will be described hereinbelow. At first, the fixing thread portion 42 of the load input member 23 is fitted into the connecting hole 63 of the seat frame 17. Therefore, a lower surface of the connecting surface 62 of the seat frame 17 comes in contact with an upper surface of the center bracket 48. Thus, the seat frame 17 is mounted on the upper rail 16 via the strain member 20. A nut 65 screwed onto the fixing thread portion 42 of the load input member 23 presses the connecting surface 62 of the seat frame 17 so that the connecting surface 62 comes in contact with the center bracket 48 into which the end shaft portion 41 of the load input member 23 is inserted. Thus, the load input member 23 of the load detecting apparatus 10 is secured at the seat frame 17 of the seat body 11.

When the load of the occupant seated on the seat body 11 is applied to the strain member 20 via the load input member 23, the strain member 20 is flexibly bent while being supported at both first and second ends thereof by the first and second lower brackets 21, 22. Therefore, compressive strain and tensile strain are generated at each area between the load input member 23 and either of the first and second lower brackets 21, 22 on the surface of the strain member 20 in proportion to the applied load. More specifically, when the external load is applied to the load input member 23, the compressive strain is generated at an area located further inwardly than an inner semi-circular portion of each of the first and second lower brackets 21 and 22, while the tensile strain is generated around the load input member 23. Herein, the inner semi-circular portion is a semi-circular portion located closer to the load input member 23 than the (imaginary) center line C, which is extended the horizontal direction of the strain member perpendicular to the longitudinal direction of the strain member 20, of each of the lower brackets 21 and 22. In order to detect the compressive strain and the tensile strain which are described above, the strain gauges G1 and G2 are attached at the area between the central portion of the strain member 20 and each of the first and second ends of the strain member 20, respectively. In other words, the strain gauge G1 is attached at the area between the load input shaft 23 and the first lower bracket 21, and the strain gauge G2 is attached at the area between the load input shaft 23 and the second lower bracket 22. Each of the strain gauges G1 and G2 includes two elements structuring a half-bridge. A full-bridge is structured by both the half-bridges of the strain gauges G1 and G2, and the strain generated in response to the flexible bending of the strain member 20 due to the external load applied thereto is converted to an electric signal and then outputted. As described above, because the first and second lower brackets 21 and 22 are welded to the strain member 20 at the outer end portions 71 and 72 which are spaced away from areas where the strain gauges G1 and G2 are attached, the strain (counter force) generated due to the welding operation is restrained from being generated at the positions where the strain gauges G1 and G2 are respectively attached and at range of areas where the strain gauges G1, G2 detect the compressive strain and the tensile strain generated due to the external load such as the load of the occupant seated on the seat. Additionally, according to the embodiment, the compressive strain is generated in the vicinity of the first and second brackets 21, 22 while the tensile strain is generated in the vicinity of the load input member 23. Alternatively, the load detecting apparatus 1 may be structured so that the compressive strain is generated in the vicinity of the load input member 23, and the tensile strain is generated in the vicinity of the first and second brackets 21 and 22. Further according to the embodiment, the strain gauges G1 and G2 are attached at the lower surface of the strain member 20. Alternatively, the strain gauges G1 and G2 may be attached at the upper surface of the strain member 20, or at both upper and lower surfaces thereof.

Figure 6:
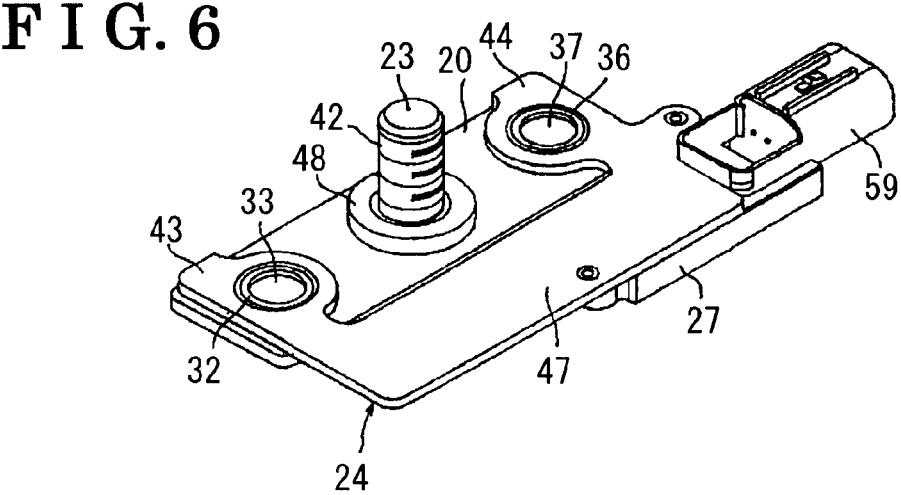
FIG. 6 is a perspective view of the assembled load detecting apparatus.

As illustrated in FIGS. 5 and 6, the upper bracket 24 is assembled on the upper surface of the strain member 20. The first and second supporting portions 43 and 44 for supporting the strain member 20 are provided at both ends of the upper bracket 24, respectively. Further, the first and second fixing holes 45, 46 are defined (formed) at the first and second supporting portions 43 and 44, respectively. The upper shaft portion 32 of the first lower bracket 21 and the second intermediate shaft portion 36 of the second lower bracket 22, both which extend from the upper surface of the strain member 20, are inserted and fitted into the first and second fixing holes 45 and 46 of the upper bracket 24, respectively. Then, first and second end portions 73 and 74 of the upper bracket 24, which are located at the outer side relative to the load input member 23, is welded to the strain member 20, thus fixing the upper bracket 24 to the strain member 20. The strain member 20 is hence supportively interposed at its both first and second ends between the first and second supporting portions 43, 44 of the upper bracket 24 and the first and second supporting portions 29, 34 of the corresponding first and second lower brackets 21, 22. Areas where the upper bracket 24 are welded to the strain member 20 is limited to the outer end portions 73, 74 of the upper bracket 24, which respectively correspond to the areas where the first and second lower brackets 21 and 22 are respectively welded to the strain member 20. Further, even though the strain (counter force) may be generated, for example, when the heated strain member 20 due to the welding is rapidly cooled, such areas where the first and second lower brackets 21, 22 and the upper bracket 24 are welded to the strain member 20 are spaced away from the areas where the strain gauges G1 and G2 are attached on the strain member 20. Therefore, strain generated due to the welding operation is restrained from being generated at the areas where the strain gauges G1 and G2 are attached to the strain member 20 and at the range of areas where the strain gauges G1, G2 detect the strain generated due to the external load.

Additionally, in a condition where positions of the first and second fixing holes 45, 46 of the upper bracket 24 are spaced away from one another to some extent so that the strain is not generated at the positions (areas) where the strain gauges G1 and G2 are attached on the strain member 20, the upper shaft portion 32 of the first lower bracket 21 and the supporting portion 43 of the upper bracket 24, and the second intermediate shaft portion 36 of the second bracket 22 and the second supporting portion 44 of the upper bracket 24 may be fixed to the strain member 20 by welding. Further according to the embodiment, the strain member 20 is supported by the upper bracket 24 and the first and second lower brackets 31, 22. Alternatively, the strain member 20 may be supported only by either of the first lower bracket 21 or the second lower bracket 22, or only by the upper bracket 24.

Further, the amplifier case attaching portion 47, which connects the first and second supporting portions 43, 44 of the upper bracket 24, is formed in the vicinity of the strain member 20 so as to extend in a longitudinal direction thereof. Thus, because the strain member 20 overlaps the first and second fixing portions 43, 44 of the upper bracket while not overlapping the amplifier attachment portion 47 of the upper bracket 24, the upper bracket 24 does not influence the flexible deformation (bending) of the strain member 20. Therefore, the external load (the load of the occupant of the seat) is precisely measured by the load detecting apparatus 10.

Next, a modified embodiment of the present invention will be described hereinafter with reference to FIGS. 8 and 9. Herein, portions being different from the structure of the above described embodiment will be mainly described.

Figure 8:
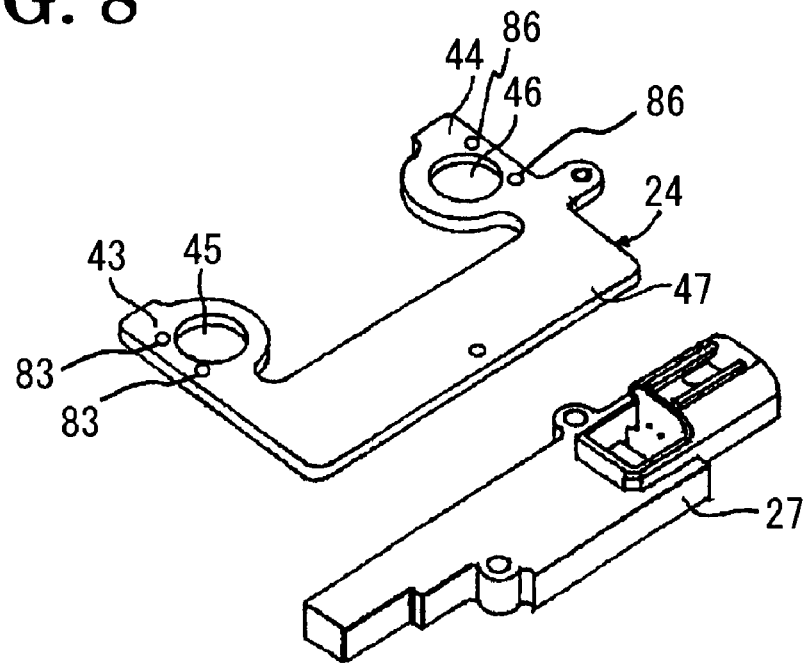
FIG. 8 is an exploded view of the load detecting apparatus according to a modified embodiment.
Figure 8:
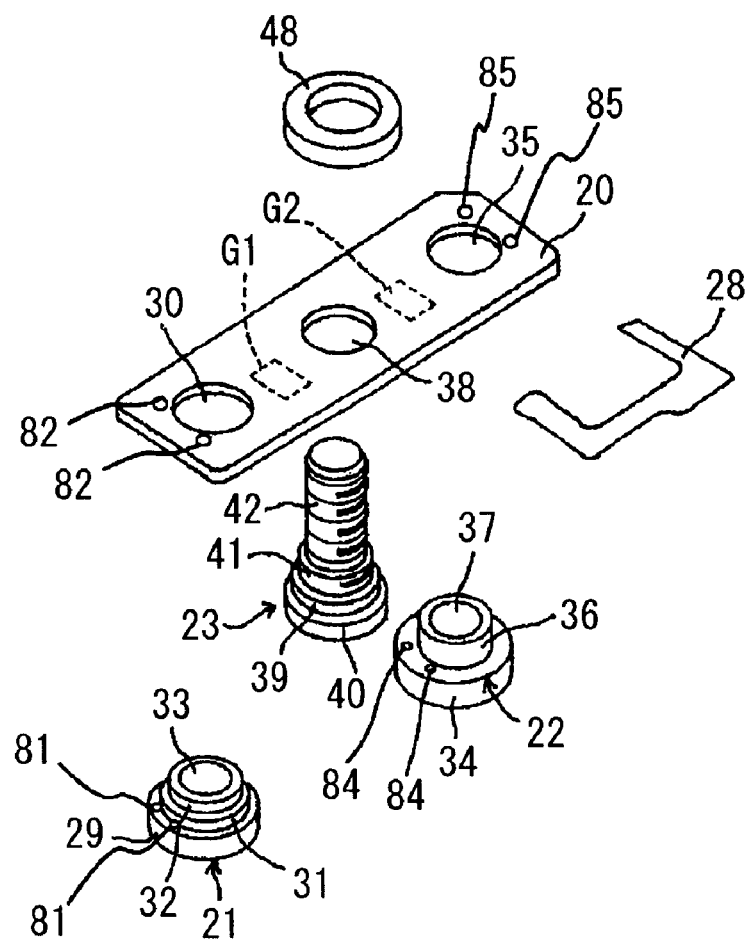
Figure 9:
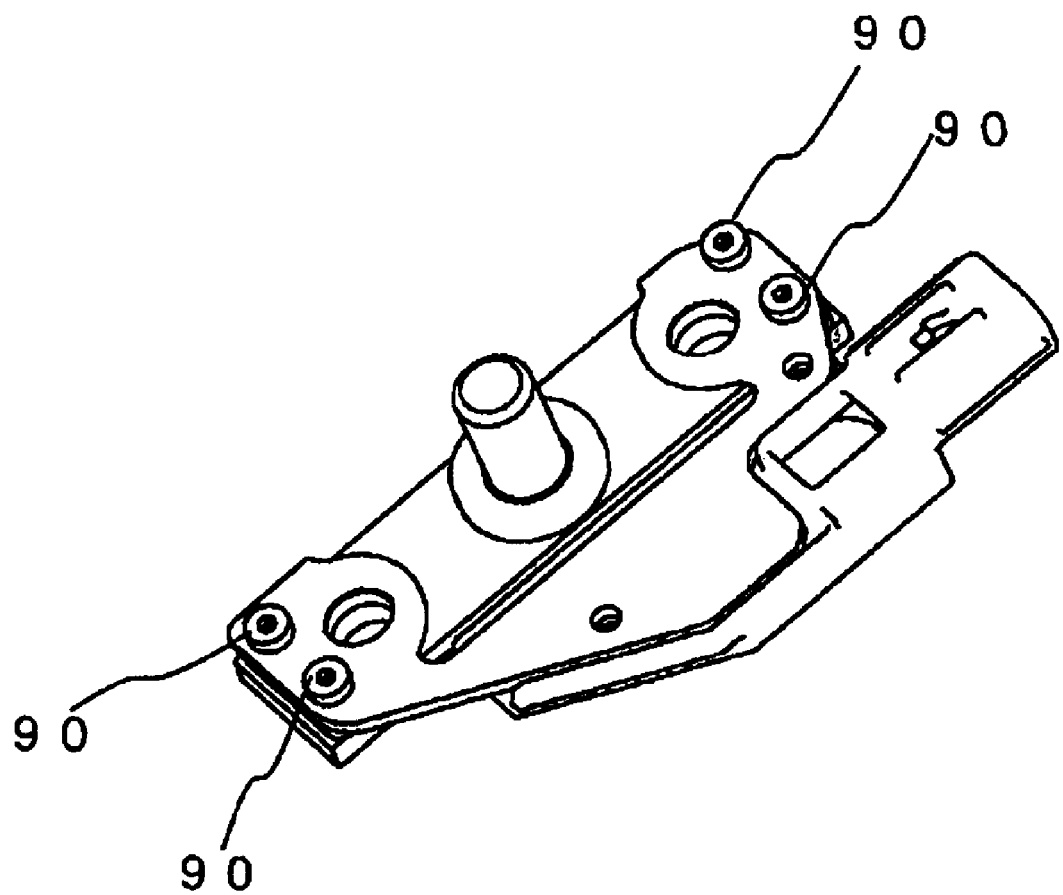
FIG. 9 is a perspective view illustrating the assembled load detecting apparatus according to the modified embodiment.

As illustrated in FIG. 8, two first through holes 82 are defined (pierced) on an outer semi-circular path of which center is concentric with that of the first hole 30 of the strain member 20. In the same manner, two second through holes 85 are defined (pierced) on an outer semi-circular path of which center is concentric with that of the second hole 35 of the strain member 20.

Further as illustrated in FIG. 8, two first attachment holes 81 are defined on the end surface (upper surface) of the first supporting portion 29 of the first lower bracket 21 at a position respectively corresponding to the first through holes 82 of the strain member 20 when being attached thereto. Thread portions are defined at inner end surfaces of the first attachment holes 81, respectively, so that two fixing bolts 90 are respectively screwed thereinto. In the same manner, two second attachment holes 84 are defined on the end surface (upper surface) of the second supporting portion 34 of the second lower bracket 34 at a position respectively corresponding to the second through holes 85 of the strain member 20 when being attached thereto. Thread portions are defined at inner end surfaces of the second attachment holes 84 so that another two fixing bolts 90 are respectively screwed (fitted) thereinto.

Still further, two first through holes 83 are defined at the first supporting portion 43 of the upper bracket 24 so as to correspond to the first through holes 82 of the strain member 20. In the same manner, two second through holes 86 are defined at the second supporting portion 44 of the upper bracket 24 so as to correspond to the second through holes 85 of the strain member 20.

The fixing bolts 90 are respectively inserted through the first through holes 83 of the upper bracket 24 and the first through holes 82 of the strain member 20, and then screwed (fitted) into the first attachment holes 81 of the first lower bracket 21. In the same manner, the fixing bolts 90 are respectively inserted through the second through holes 86 of the upper bracket 24 and the second through holes 85 of the strain member 20, and then screwed (fitted) into the second attachment holes 84 of the second lower bracket 22. Thus, the strain member 20 is supported (interposed) between the first and second lower brackets 21, 22 and the upper bracket 24 and is secured thereto. Because the fixing bolts 90 are fixedly connected at outer positions relative to the load input member 23, i.e., at the outer end portions 73, 74 of the upper bracket 24 and at the outer end portions 71, 72 of the first and second lower brackets 21, 22 (see FIG. 7), the strain (counter force) generated when connecting the fixing bolts 90 is restrained from being generated at the positions where the strain gauges G1 and G2 are attached on the strain member 20 and further, the strain generated due to the external force (load of the occupant of the seat) is precisely detected by means of the strain gauges G1 and G2 (strain detecting elements).

In the same manner as the embodiment described above, though the first intermediate shaft portion 31 and the upper shaft potion 32 are provided at the first supporting potion 29 of the first lower bracket 21, the first lower bracket 21 may include only the first supporting portion 29, or only the supporting potion 29 and the first intermediate shaft portion 31. Further, though the second intermediate shaft portion 36 is provided at the second supporting portion 34 of the second lower bracket 22, the second lower bracket 22 may include only the second supporting portion 34. Still further, though being formed in a circular shape according to the above described embodiment, the first and second lower brackets 21 and 22 may be formed in any other shape, such as a quadrate, for example. Further, the strain member 20 may be supported only by either of the first lower bracket 21 or the second lower bracket 22, or only by the upper bracket 24.

Still further, according to the above described embodiment (modified embodiment), the thread portions for connecting the fixing bolts 90 are formed at the first and second attachment holes 81, 84 of the first and second lower brackets 21, 22. Alternatively, the fixing bolts 90 may be screwed to the first and second through holes 83 and 86 of the upper bracket 24.

Still further, in place of the fixing bolts 90, other connecting members such as a hinge pin, for example, may be employed for connecting the strain member 20 and the upper and lower brackets 21, 22 and 24.

As described above, according to the embodiment of the load detecting apparatus 10, the first and second lower brackets 21, 22 (serving as first and second supporting members) are secured to the strain member 20 at the outer end portions 71, 72 of the supporting portions 29, 34 of the first and second lower brackets 21, 22. The outer end portions 71, 72 are located at the outer positions relative to the load input member 23. Further, the upper bracket 24 (supporting member) is fixed to the strain member 20 at the outer end portions 73, 74 of the first and second supporting portions 43, 44, which are located at the outer positions relative to the load input member 23. Therefore, the strain, which may be generated when fixing (welding/connecting) such members, is restrained from being generated at the positions where the strain gauges G1, G2 (the strain detecting elements) are attached on the strain member 20, thus reducing an influence to the detection of the strain due to the external load by the strain gauges G1 and G2. Accordingly, a value outputted from the strain gauges G1 and G2 (the strain detecting elements) is restrained from being deviated from a zero point (a point of origin), and the detecting accuracy (sensitivity) may not be negatively affected, thus leading to precisely measuring the external load (load of the occupant seated on the seat).

Further, as described above, the strain member 20 and the first and second supporting potions 29, 34 of the first and second lower brackets 12, 22 are fixed to each other by welding or by means of the connecting member (the fixing bolts 90) at the outer end portions 71, 72 of the first and second supporting portions 29 and 34. In the same manner, the strain member 20 and the first and second supporting portions 43, 44 of the upper bracket 24 are fixed to each other by welding or by means of the connecting member (the fixing bolts 90) at the outer end portions 73, 74 of the first and second supporting portions 43 and 44. Thus, the upper bracket 24 and the first and second lower brackets 21, 22 are fixedly connected to the strain member 20 while the strain, which may be generated when fixing such members to the strain member 20, is restrained from influencing the positions where the strain gauges G1, G2 are respectively attached on the strain member 20.

Still further, the first and second upper brackets 21, 22 and the upper bracket 24 are attached at the upper rail 16 (rail member) for supporting the seat for the vehicle, while the load input member 23 is attached at the seat frame 17 provided at an upper side of the upper rail 16, thus assembling the load detecting apparatus 10 to the seat for the vehicle. Accordingly, the load of an occupant seated on the seat for the vehicle is precisely measured.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load detecting apparatus, comprising:
a strain member having a first hole, a second hole, and a center hole formed between the first hole and the second hole;
a first supporting member and a second supporting member assembled on a rail member supporting a seat for a vehicle for supporting the strain member at supporting portions thereof,
a load input member assembled to a seat body of the seat located above the rail member to receive a load of an occupant seated on the seat and supported by the strain member and straining the strain member when an external load is applied thereon; and
a first strain detecting element provided at a surface of the strain member between the first hole and the center hole,
a second strain detecting element provided at the surface of the strain member between the second hole and the center hole,
the first and second strain detecting elements to detect the strain generated by the load input member,
wherein an outer end of the supporting portions located outwardly relative to the load input member is fixed to the strain member,
the first supporting member inserted in the first hole and fixed to the strain member,
the second supporting member inserted in the second hole,
the load input member inserted in the center hole,
the first supporting member and the second supporting member fitting into a pair of fixing shafts that are formed at the rail member.

2. A load detecting apparatus according to claim 1, wherein the strain member is an elongated member,
the first and second supporting members for supporting the strain member are positioned at longitudinal end portions of the strain member,
the load input member supported by the strain member is spaced away from the first and second supporting members in a longitudinal direction of the strain member,
the first and second strain detecting elements are provided between the first and second supporting members and the load input member, and wherein
the outer end of the supporting portions fixed at the strain member includes an end portion located outwardly relative to the load input member further than a center line of the first and second supporting members which extends the horizontal direction of the strain member perpendicular to the longitudinal direction of the strain member.

3. A load detecting apparatus according to claim 2, wherein the outer end portion of the first supporting portion is secured at the strain member by welding.

4. A load detecting apparatus according to claim 2, wherein the outer end portion of the first supporting portion is secured at the strain member by a connecting member.

5. A load detecting apparatus according to claim 1, wherein the outer end of the first supporting portion is secured at the strain member by welding.

6. A load detecting apparatus according to claim 1, wherein the outer end of the first supporting portion is secured at the strain member by a connecting member.

7. A load detecting apparatus according to claim 1, wherein the first supporting member includes a first supporting portion, a first intermediate shaft portion protrudes upwardly from the first supporting portion and is to be inserted into the first hole, an upper shaft portion protruding from the first intermediate shaft portion and a first attachment hole are formed at a center of the first supporting member.

8. A load detecting apparatus according to claim 7, wherein a flange is formed at an end portion of the load input member, and a thickness of the flange is smaller than thickness of the first supporting portion of the first supporting member.

9. A load detecting apparatus according to claim 1, wherein the second supporting member includes a second supporting portion, a second intermediate shaft portion protrudes upwardly from the second supporting portion and is to be inserted into the first hole, an upper shaft portion protruding from the second intermediate shaft portion and a second attachment hole are formed at a center of the second supporting member.

10. A load detecting apparatus according to claim 9, wherein a flange is formed at an end portion of the load input member, and a thickness of the flange is smaller than thickness of the second supporting portion of the second supporting member.

* * * * *